US008030601B2

(12) United States Patent
Llorente Gil

(10) Patent No.: US 8,030,601 B2
(45) Date of Patent: Oct. 4, 2011

(54) HEATING DEVICE FOR AN INDUCTIVE COOKING DEVICE

(75) Inventor: Sergio Llorente Gil, Zaragoza (ES)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 602 days.

(21) Appl. No.: 11/885,324

(22) PCT Filed: Dec. 27, 2005

(86) PCT No.: PCT/EP2005/057179

§ 371 (c)(1),
(2), (4) Date: Aug. 29, 2007

(87) PCT Pub. No.: WO2006/092179

PCT Pub. Date: Sep. 8, 2006

(65) Prior Publication Data

US 2008/0164249 A1 Jul. 10, 2008

(30) Foreign Application Priority Data

Mar. 1, 2005 (ES) .................................. 200500543

(51) Int. Cl.
*H05B 6/12* (2006.01)
*H02M 5/42* (2006.01)

(52) U.S. Cl. ............ 219/620; 363/97; 363/98; 363/132; 363/24; 363/133

(58) Field of Classification Search .................. 219/620, 219/10.77, 10.49, 625, 624; 363/97, 98, 363/132, 131, 24, 133, 25, 55, 56
See application file for complete search history.

(56) References Cited

U.S. PATENT DOCUMENTS

| | | | | |
|---|---|---|---|---|
| 3,275,784 | A | 9/1966 | Merrett | |
| 4,542,273 | A * | 9/1985 | Hirata | 219/662 |
| 6,633,023 | B2 * | 10/2003 | Cornec et al. | 219/624 |
| 6,904,378 | B2 * | 6/2005 | Schilling et al. | 702/99 |
| 7,022,952 | B2 * | 4/2006 | de Rooij et al. | 219/624 |

FOREIGN PATENT DOCUMENTS

| | | | |
|---|---|---|---|
| EP | 0 376 760 | | 7/1990 |
| EP | 0 498 735 | | 8/1992 |
| EP | 1 463 383 | | 9/2004 |
| JP | 02114488 | A * | 4/1990 |
| JP | 3192687 | | 8/1991 |
| JP | 05174955 | A * | 7/1993 |
| JP | 2004-296279 | | 10/2004 |

OTHER PUBLICATIONS

JP05-174955A-1993.pdf machine translation.*
JP02114488A_English_translation.pdf.*
International Search Report PCT/EP2005/057179.
National Search Report ES 2 265 758.

* cited by examiner

*Primary Examiner* — Henry Yuen
*Assistant Examiner* — Ket D Dang
(74) *Attorney, Agent, or Firm* — James E. Howard; Andre Pallapies

(57) ABSTRACT

A heating device for an inductive cooking device is provided and includes a first resonant circuit, with at least one first and one second inductor, for the transmission of heat energy to a heating element for heating thereof and a first circuit for energising the first resonant circuit and introduction of the heat energy to the inductors. Differing cooking containers may be effectively heated, whereby the heating device has a switching device by which the heating energy is selectively supplied to only one of the inductors or simultaneously to both inductors in a parallel circuit.

18 Claims, 4 Drawing Sheets

HEATING DEVICE FOR AN INDUCTIVE COOKING DEVICE

Figure 1:
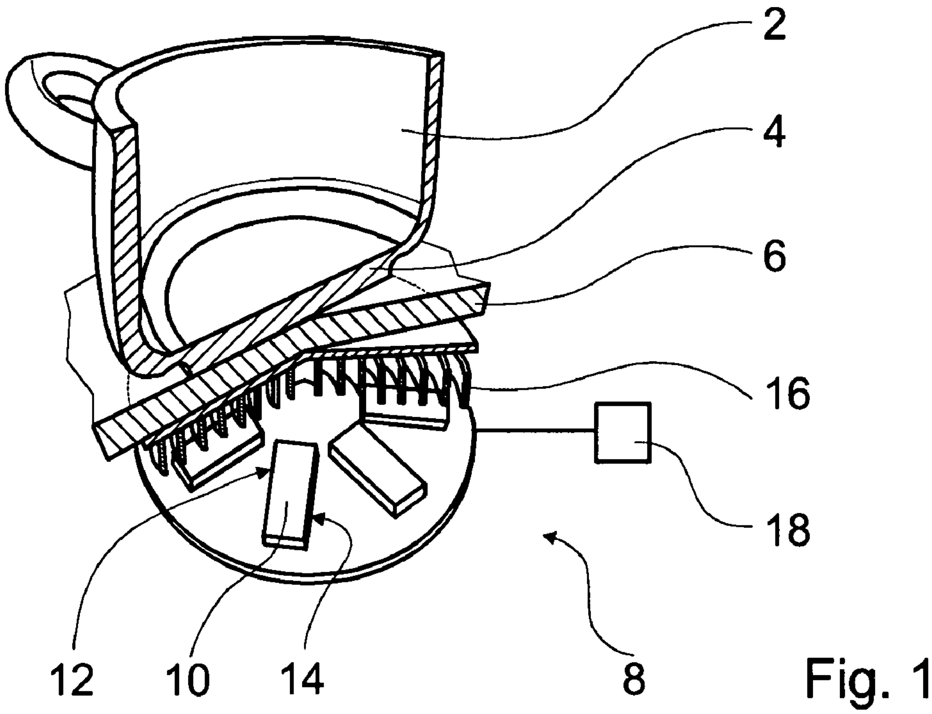

The present invention is based on a heating facility for an induction cooking device as claimed in the preamble of claim 1.

An induction cooking device with a number of inductors is known from U.S. Pat. No. 6,633,023 B2, said inductors being provided to heat a single heating element, for example a large pan and being disposed accordingly. Depending on the size of the pan, one or more inductors can be connected to a generator by means of a switching means, said generator energizing these inductors to resonate to heat the heating element.

The object of the invention is to provide a generic device, with which different cooking containers can be effectively heated.

According to the invention this object is achieved by the features of claim 1, while advantageous refinements and developments of the invention can be found in the subclaims.

The invention is based on a heating facility for an induction cooking device with a first resonant circuit, comprising at least a first and a second inductor, to transfer heat energy to a heating element to be heated and a first circuit to energize the first resonant circuit and to supply the heat energy to the inductors.

It is proposed that the heating element comprises a switching means, by means of which the heat energy can be supplied optionally to just one of the inductors or both inductors simultaneously in a parallel circuit. By optionally supplying the heat energy to just one of the inductors or to both inductors simultaneously it is possible to heat both small and large or oblong cooking containers effectively on a single heating region. The fact that the two inductors are connected in a parallel manner means that inductors with different impedances can be used. The inductors do not necessarily have to have the same or at least similar impedances, as is expedient for a series circuit, but a large main inductor and a significantly smaller secondary inductor can be used for example. The relatively free choice of options for the inductors means that a plurality of differently configured induction cooking devices can be developed with a standard design.

The switching means allows one of the two or both inductors to be connected, preferably directly, to the circuit for energizing the first resonant circuit. The induction cooking device can be kept particularly simple, if the heat energy is supplied by connecting voltage drawn from a power supply network. There is then no need for an additional resonant circuit. The circuit for energizing the first resonant circuit preferably has a half-bridge circuit. In a particularly economical refinement of the invention the second inductor is operated solely together with the first inductor.

The two inductors expediently serve to heat a single heating element, for example a single pan. They are preferably disposed in immediate proximity to each other. Large or oblong cooking devices can be heated particularly effectively, if the inductors are disposed in a continuous heating region for heating a single heating element.

The risk of uneven heating of a cooking vessel by both inductors simultaneously can be counteracted, if the heat outputs of the inductors have a fixed, predetermined relationship to each other. Thus for example an inductor, to which a smaller heating sub-region is assigned than the other inductor, can in principle be operated with a lower output than the other inductor.

Particularly user-friendly operation of the induction cooking device can be achieved, if both inductors can be connected individually to the first circuit by means of the switching means. Both inductors can be handled in an identical manner by an operator and a small pan can for example be positioned optionally above one or the other inductor for heating purposes.

In a further refinement of the invention the heating facility has a rectifier, to which both the first resonant circuit and also a second resonant circuit with a second circuit for energizing the second resonant circuit and a further inductor are connected. This means that a single heating zone can be effectively heated to heat a single cooking vessel by means of three or more inductors, with just one generator being deployed with a rectifier, it being possible to achieve a high required output by means of two resonant circuits.

Unwanted noise while a cooking vessel is being heated can be prevented by means of control unit, which is also set up to control the circuits in such a manner that the first circuit always energizes the first resonant circuit to resonate at the same frequency as the second circuit does the second resonant circuit. The equal connection of the resonant circuits can be effected here regardless of operation of the induction cooking device.

It is also proposed that the heating facility has a further circuit for energizing a further resonant circuit with a further inductor and a further switching means, it being possible to connect the further circuit optionally to the first or further resonant circuit by means of the further switching means. A large output can be transmitted to the first resonant circuit by both circuits for energizing purposes, without having to load electrical components of one of the circuits to a particularly significant degree as a result. The further circuit can back up the first circuit with its output.

The heating facility advantageously has a means, which is provided to measure a characteristic of the resonant circuit consecutively with the switching means open and closed and to identify whether the heating element is disposed on just one or both inductors. It can be identified automatically, for example with the aid of a control unit, whether the heating element should be heated adequately with one inductor or more evenly with both inductors, and the switching means can be switched automatically according to the more effective variant. There is no need for the operator to decide whether one of the two or both inductors are to be used to heat the heating element.

The heating facility expediently has a control unit, which is provided to activate the switching means at a time when no voltage is present at the circuit to energize the resonant circuit. This allows safe switching of the switching means without particularly loading the electrical components of the induction cooking device. The control unit is advantageously also set up to interrupt the voltage before the switching means is connected or to set it to a predetermined value.

Further advantages will emerge from the description of the drawing below. The drawing shows exemplary embodiments of the invention. The drawing, description and claims contain numerous features in combination. The person skilled in the art will expediently also consider the features individually and combine them in expedient further combinations.

Figure 2:
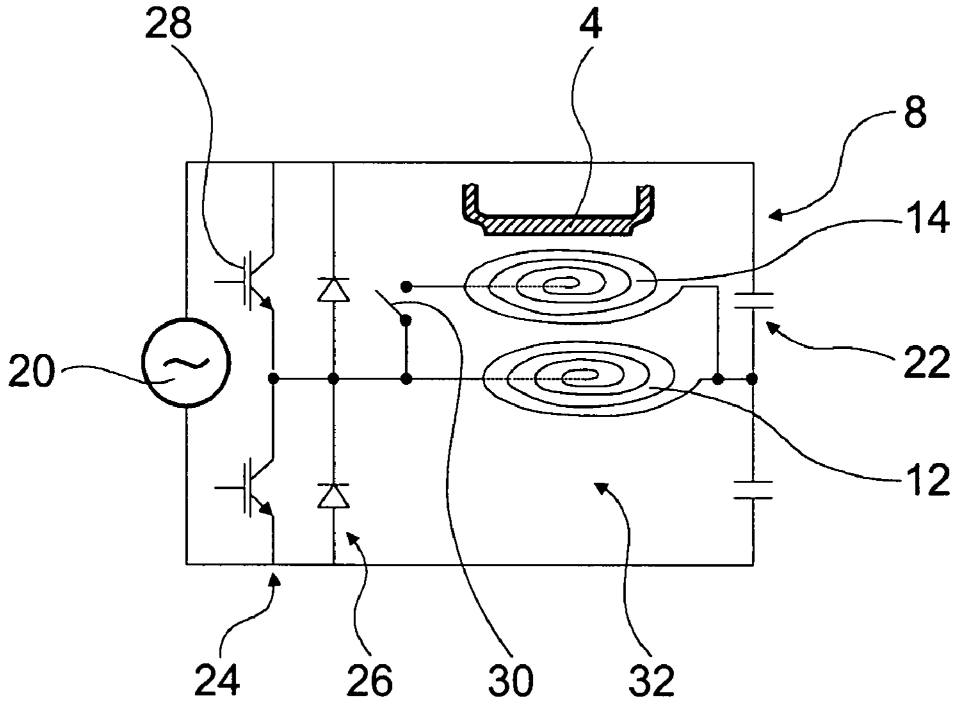
Figure 3:
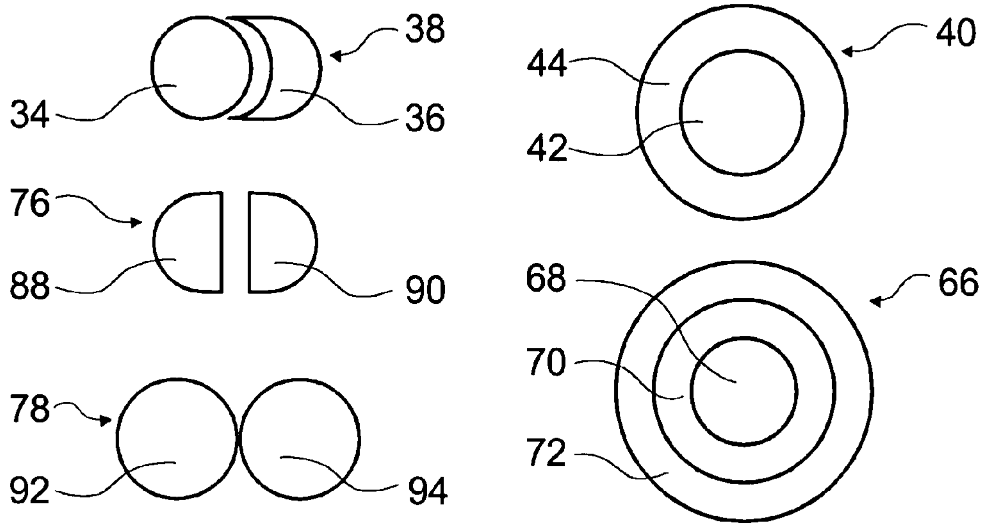
Figure 4:
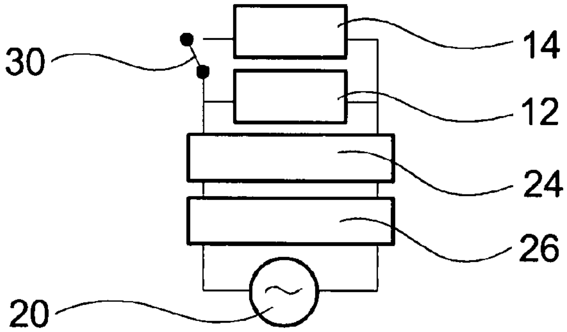
Figure 5:
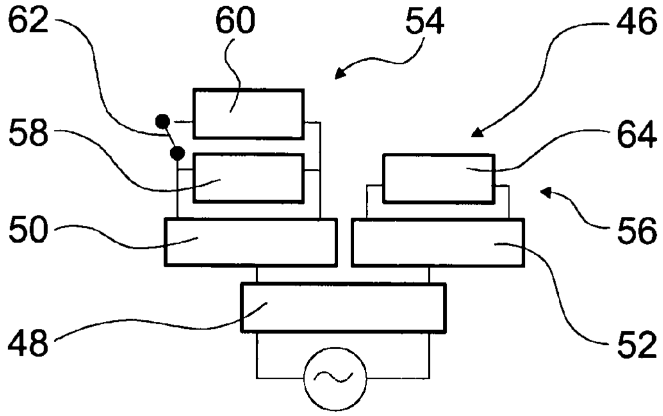
Figure 6:
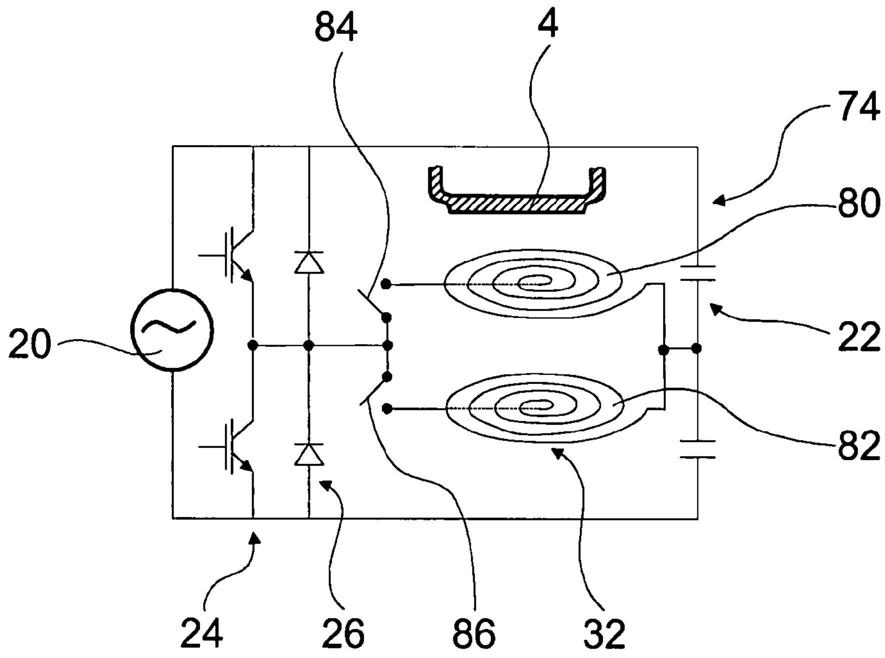
Figure 7:
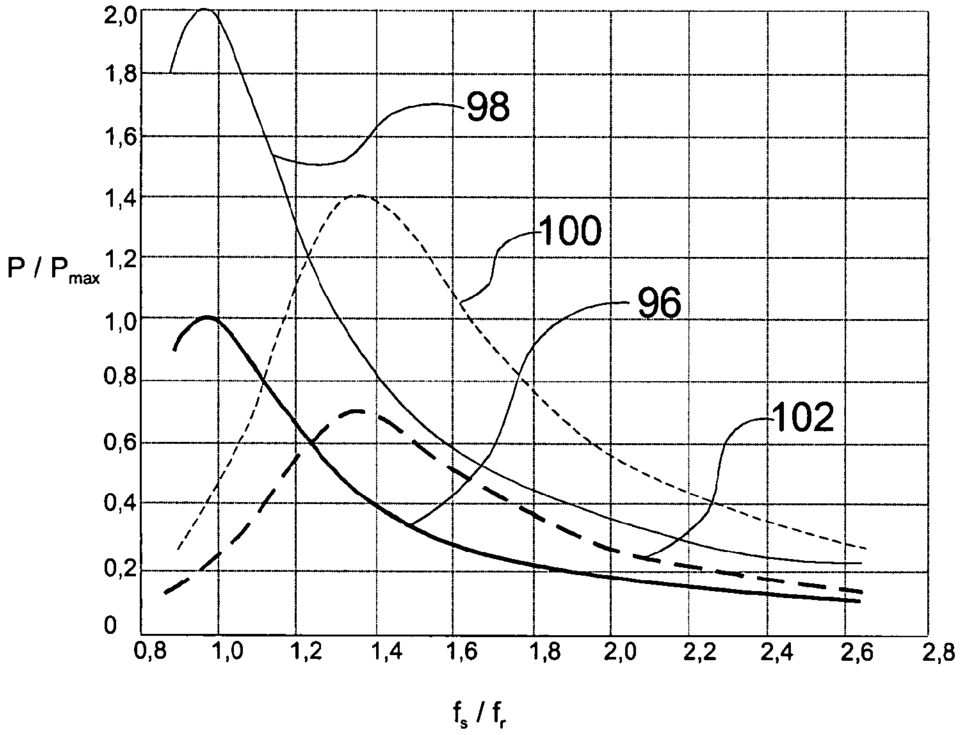
Figure 8:
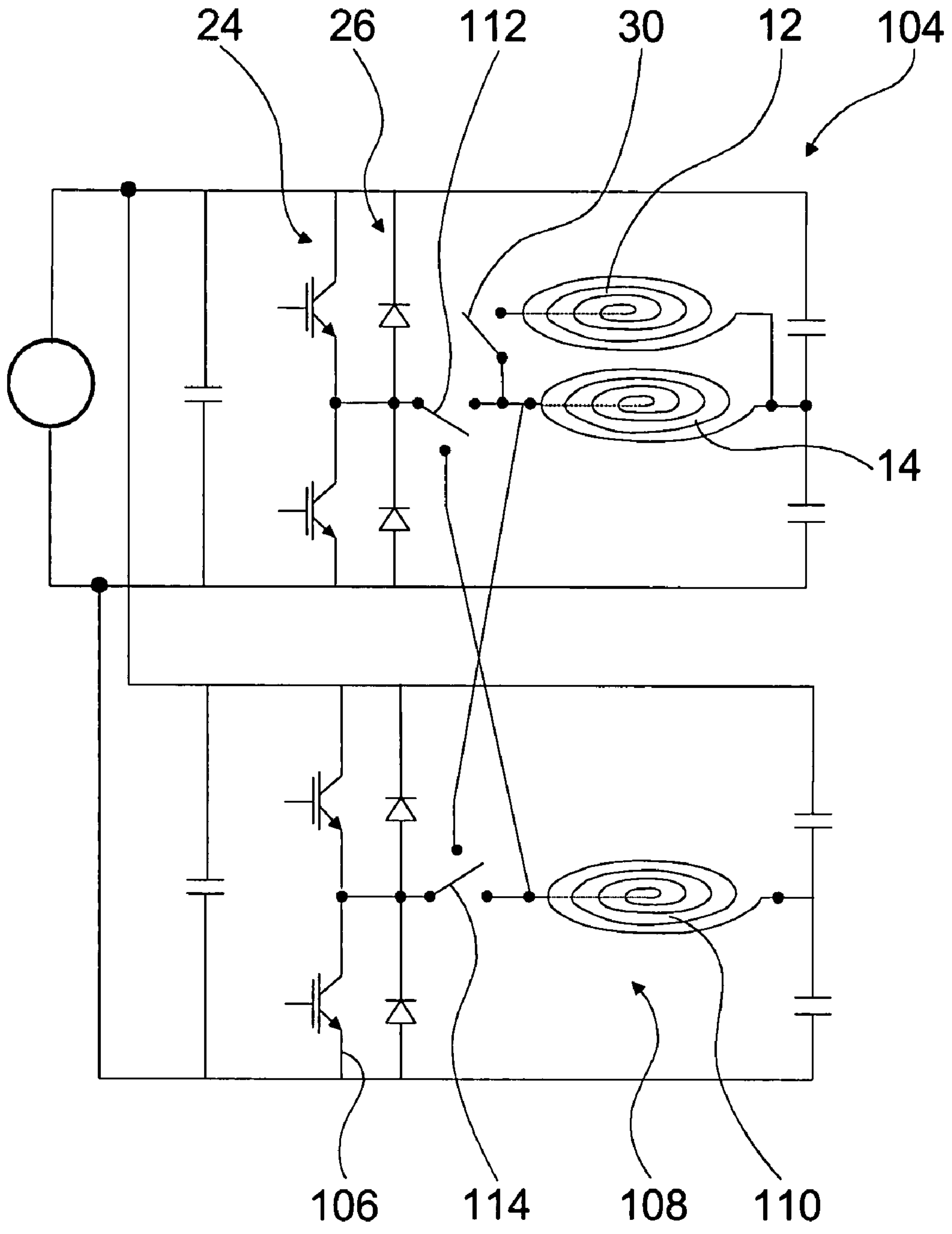

FIG. 1 shows a schematic sectional diagram through a pan and part of an induction cooking zone, FIG. 2 shows a circuit diagram of a resonant circuit with two inductors and a switching means between the two inductors, FIG. 3 shows 5 different heating regions for an induction cooking zone with a number of heating sub-zones assigned respectively to an inductor, FIG. 4 shows a block circuit diagram of a heating unit as in FIG. 2, FIG. 5 shows a block circuit diagram of a further heating unit with three inductors and two circuits for energizing a resonant circuit respectively, FIG. 6 shows a block circuit diagram of a further heating facility with two inductors and a switching means, with which optionally one of the two inductors or both inductors can be energized simultaneously, FIG. 7 shows heat outputs of different resonant circuits and inductors, plotted respectively against their energizing frequency and FIG. 8 shows a circuit diagram of a further heating facility with three inductors and a second circuit, which can be used to back up a first circuit for energizing a resonant circuit.

FIG. 1 shows a section through a pan 2 with a pan base, which is provided as a heating element 4 for a liquid or food present in the pan 2. The pan 2 stands on a support plate 6 of an induction cooking zone of an induction cooking device, below which a heating facility 8 for the inductive heating of the heating element 4 is disposed. The heating facility 8 has a number of winding blocks 10, each having an inner and outer coil. The inner coils are hereby combined to form a first inductor 12 and the outer coils to form a second inductor 14. The magnetic field produced by both inductors 12, 14 is deflected by a directing structure 16 to the heating element 4 and produces eddy currents as it flows through the heating element 4, said eddy currents heating the heating element 4. Production of the magnetic field is controlled by the control unit 18.

FIG. 2 shows a circuit diagram of the heating facility 8, which is provided for connection to an alternating voltage of a power supply network 20. The heating facility 8 comprises the two inductors 12, 14, a capacitive element 22 with two capacitors, a circuit 24 configured as a half-bridge circuit with two power transistors 28 for connecting a switching voltage to one or both of the inductors 12, 14 and a rectifier 26 having two diodes. A switching means 30 can connect the second inductor 14 to the circuit 24 as well as the first inductor 12. The circuit 24, the capacitive element 22 and one or both of the inductors 12, 14 form a resonant circuit 32, which can be energized to resonate by the circuit 24, the circuit 24 supplying heat energy to one or both of the inductors 12, 14 to heat the heating element 4.

The elements of the heating facility 8 shown in FIGS. 1 and 2 are used below to describe several examples, with the same or similar elements being assigned the same reference characters.

The first inductor 12 is disposed below a first heating sub-region 34 of the support plate 6, as shown in FIG. 3. The second inductor 14 is disposed below a second heating sub-region 36. The two heating sub-regions 34, 36 are disposed in direct proximity to each other and together form a heating region 38 for heating an oval or oblong heating element 4 of a cooking vessel, for example a casserole or a fish kettle. With the switching means 30 in the position shown in FIG. 2 only the first inductor 12 is connected to the circuit 24 for energizing the resonant circuit 32.

When the resonant circuit 32 is energized by the circuit 24 the second inductor 14 is not however energized at the same time. Heat in the heating element 4 is therefore only generated by the magnetic field produced by the first inductor 12. This position of the switching means 30 is suitable for heating a small pan 2 with a small heating element 4, which stands on the first heating sub-region 34. When a bigger, oblong pan 2 is used, the switching means 30 can be closed and the second inductor 14 can be connected to the circuit 24. Both inductors 12, 14 now resonate, causing the entire heating region 38 to be subjected to a magnetic field provided to heat the heating element 4. In this example the output of the second inductor 14 can be less than the first inductor, as the second heating sub-region 36 is rather smaller in surface than the first heating sub-region 34. The heat outputs of the inductors 12, 14 here have a fixed, predetermined relationship to each other.

A heating region 40 with two heating sub-ranges 42, 44 disposed concentrically in relation to each other, as shown in FIG. 3, is particularly suitable for heating large, round pans. Here a smaller first heating sub-region 42 is encircled by a larger second heating sub-region 44. The switching means 30 is opened to heat a small pan 2, so that the first inductor 12 is connected to the circuit 24. The switching means 30 is closed to heat a larger pan 2 and the second inductor 14, which in this example is designed to be more powerful than the first inductor 12, is also connected to the circuit 24 to energize the resonant circuit 32.

FIG. 4 shows a block circuit diagram of the heating facility 8 from FIG. 2. The heating facility 8 comprises the rectifier 26, the circuit 24, the two inductors 12, 14 and the switching means 30.

The block circuit diagram shown in FIG. 5 shows an alternative heating facility 46, to whose rectifier 48 two circuits 50, 52 for energizing a resonant circuit 54, 56 respectively are connected. The first resonant circuit 54 here comprises two inductors 58, 60, of which the inductor 60 can be connected to the first circuit 50 by way of a switching means 62. The second resonant circuit 56 only comprises a single inductor 64. Both circuits 50, 52 can be activated respectively in an individual manner by the control unit 18, so that one, two or three inductors 58, 60, 64 can be activated together with the switching means 62. Such a heating facility 46 is particularly suitable for a heating region 66 as shown in FIG. 3 with three heating sub-regions 68, 70, 72 for a small, medium and very large pan 2. To heat a large pan 2 or large heating element 4 on the heating region 66 using the two circuits 50, 52, the two circuits 50, 52 are constantly activated by the control unit 18, so that all the energized inductors 58, 60, 64 are energized to resonate with the same frequency, to prevent interference resonance in the pan 2.

FIG. 6 shows a heating facility 74, which is particularly suitable for heating regions 76, 78 as shown in FIG. 3. Two inductors 80, 82 can be connected individually or in a common manner to the circuit 24 for energizing the resonant circuit 32 respectively by way of a switching means 84, 86. The inductors 80, 82 have identical output regions for example and are therefore particularly suitable for disposing below identical heating sub-regions 88, 90 or 92, 94 of the heating regions 76 and 78, which are provided respectively for heating a very small or small pan 2 or for heating a medium or large oblong pan 2 in a common manner. To heat a very small or small round pan 2 the inductors 80, 82 can be connected respectively in an individual manner to the circuit 24. To heat a medium or large oblong pan 2, both switching means 84, 86 are closed and both inductors 80, 82 are connected to the circuit 24, thereby being energized to transmit energy to the heating element 4.

The diagram in FIG. 7 shows the output P of the inductors 12, 14 or 80, 82 plotted against the switching frequency $f_s$ of the circuit 24. The output P is plotted in relation to the maximum output $P_{max}$ of the only connected inductor 12 and respectively 80 or 82 and the switching frequency $f_s$ is plotted in a normalized manner in respect of the resonant frequency $f_r$ of the oscillating circuit 32 with just one connected inductor 12 and respectively 80 or 82. The curve 96 here shows the output of an inductor 12 and respectively 80 or 82 connected individually to the circuit 24. To control the output P of the inductor 12 and respectively 80 or 82 the control unit 18 sets a switching frequency $f_s$ between for example 1.0 $f_r$ and 1.8 $f_r$, which corresponds to the required output P. The output in this example is variable between $P_{max}$ and 0.2 $P_{max}$. If two circuits 50, 52 are available, as with the heating facility 46 in FIG. 5, the total output of the two inductors 58, 64 together—with the inductor 60 disconnected—can reach the value 2 $P_{max}$, as shown by the curve 98. However if just one circuit 24 with two inductors 12, 14 is available, as shown in FIGS. 2 and 4, with both inductors 12, 14 connected to the circuit 24 and being energized by it, only a maximum output from both inductors together of around 1.4 $P_{max}$ is available, as shown by the curve 100. The output of a single inductor 12, 14 respectively is shown by the curve 102.

As shown by the curves 96, 98, 100, 102, when the switching means 30 is switched, the resonance frequency $f_r$ of the resonant circuit 32 is displaced as well as the output P. Therefore the control unit 18 interrupts the voltage to the inductors 12, 14 and respectively 80, 82 before the switching means 30 is switched, to prevent heavy loading of the electrical components of the heating facility 8, 46, 74. As shown in FIG. 7, closing the switching means 30 results in an increase in the total output of both inductors 12, 14 together compared with the output of the individual inductor 12, but the individual outputs of the inductors 12, 14, shown in curve 102, are reduced compared with the individual output of the sole inductor 12 connected to the circuit 24.

FIG. 8 shows a further exemplary embodiment, with which this relative loss of output can be counteracted. It shows a heating facility 104, whose components remain the same as those of the heating facility 8 and therefore essentially have the same reference characters. Reference can also be made to the description relating to the exemplary embodiment in FIGS. 2 and 4 for identical features and functions. The heating facility 104 has a further circuit 106 for energizing a further resonant circuit 108 with a further inductor 110. The heating facility 104 also has two further switching means 112, 114, which—like the switching means 30—can be activated by the control unit 18. Depending on the switching position of the switching means 112, 114, the inductor 110 can be connected to the circuit 106 and the inductors 12, 14 can be connected to the circuit 24 or the inductor 110 can be connected to the circuits 24 and 106 or the inductors 12, 14 can be connected to the circuits 24 and 106. As a result—with the switching means 30 closed—both circuits 24 and 106 can energize the inductors 12, 14 and both inductors 12, 14 can be operated respectively in an individual manner with the curve 96 shown in FIG. 7 or together with the output P according to curve 98—without heavy loading of the electrical components of the circuits 24, 106. This is particularly suitable for use with the heating region 40, with respectively large heating sub-regions 43, 44 for heating a very large pan 2. It is also possible to dispose all three inductors 12, 14, 110 in direct proximity to each other for use with the heating region 66, to operate the heating sub-regions 68, 70 with a particularly large output P or all three heating sub-regions 68, 70, 72 with a distributed output P.

To identify whether on the heating region 40 for example a small pan 2 is only disposed on the heating sub-region 42 or a large pan is also disposed on the heating sub-region 44, the control unit 18 is provided to determine a variable associated with the inductivity of the resonant circuit 32. By measuring this variable both with the switching means 30 closed and with the switching means 30 open, it is possible to draw a conclusion about the arrangement of a large or small pan 2 in the heating region 40 and the switching means 30 can be switched accordingly for efficient heating of the pan 2 or its heating element 4.

REFERENCE CHARACTERS

2 Pan
4 Heating element
6 Support plate
8 Heating facility
10 Winding blocks
12 Inductor
14 Inductor
16 Directing structure
18 Control unit
20 Power supply network
22 Element
24 Circuit
26 Rectifier
28 Power transistor
30 Switching means
32 Resonant circuit
34 Heating sub-region
36 Heating sub-region
38 Heating region
40 Heating region
42 Heating sub-region
44 Heating sub-region
46 Heating facility
48 Rectifier
50 Circuit
52 Circuit
54 Resonant circuit 112 Switching means
56 Resonant circuit 114 Switching means
58 Inductor
60 Inductor
62 Switching means
64 Inductor
66 Heating region
68 Heating sub-region
70 Heating sub-region
72 Heating sub-region
74 Heating facility
76 Heating region
78 Heating region
80 Inductor
82 Inductor
84 Switching means
86 Switching means
88 Heating sub-region
90 Heating sub-region
92 Heating sub-region
94 Heating sub-region
96 Curve
98 Curve
100 Curve
102 Curve
104 Heating facility
106 Circuit
108 Resonant circuit
110 Inductor
112 Switching means
114 Switching means

The invention claimed is:

1. A heating facility for an induction cooking device, the heating facility comprising:

a first resonant circuit, having at least a first inductor and a second inductor for inducing current to a heating element to be heated of the induction cooking device;

a first energising circuit for energising the first resonant circuit and supplying the heat energy to the inductors; and a first switching means having at least a first operating mode in which the switching means permits the supply of heat energy to a selected one of the first inductor and the second inductor and a second operating mode in which the switching means permits the supply of heat energy simultaneously to both the first inductor and the second inductor in a parallel circuit.

2. The heating facility as claimed in claim 1, wherein the first inductor and the second inductor are disposed in a continuous heating region for heating the heating element.

3. The heating facility as claimed in claim 1, wherein the heat outputs of the first inductor and the second inductor have a predetermined relationship to each other.

4. The heating facility as claimed in claim 1, wherein the first inductor and the second inductor are connected individually to the first energising circuit by the first switching means.

5. The heating facility as claimed in claim 1 and further comprising a rectifier to which both the first resonant circuit and a second resonant circuit with a second energising circuit for energising the second resonant circuit and a third inductor are connected.

6. The heating facility as claimed in claim 5 and further comprising a control unit operable to control the first energising circuit and the second energising circuit in such a manner that the first energising circuit constantly energizes the first resonant circuit to resonate with the same frequency at which the second resonant circuit is caused to resonate by the second energising circuit.

7. The heating facility as claimed in claim 1 and further comprising a second energising circuit for energising a second resonant circuit with a third inductor and a second switching means, the second energising circuit being a selected one of connected and not connected to a selected one of the first resonant circuit and the second resonant circuit via the second switching means.

8. The heating facility as claimed in claim 1 and further comprising a measuring-and-identification device to measure a characteristic of the first resonant circuit consecutively with the first switching means open and closed and to identify whether the heating element is disposed on only the first inductor, only the second inductor, or both the first inductor and the second inductor.

9. The heating facility as claimed in claim 1 and further comprising a control unit to activate the first switching means at a time when no voltage is present at the circuit for energising the first resonant circuit.

10. A heating facility for an induction cooking device, comprising:

a first resonant circuit, having at least a first inductor and a second inductor for inducing current to a heating element;

a first energising circuit for energising the first resonant circuit;

a first switching means having at least a first operating mode in which the switching means permits supplying heat energy to a selected one of the first inductor and the second inductor and a second operating mode in which the switching means permits supplying heat energy simultaneously to both the first inductor and the second inductor in a parallel circuit;

a second resonant circuit, having a third inductor for inducing current to the heating element;

a second energising circuit for energising the second resonant circuit; and a control unit to control the first energising circuit and the second energising circuit such that the first resonant circuit resonates at a same frequency as the second resonant circuit.

11. The heating facility as claimed in claim 10, wherein the first inductor and the second inductor are disposed in a continuous heating region for heating the heating element.

12. The heating facility as claimed in claim 10, wherein heat outputs of the first inductor and the second inductor have a predetermined relationship to each other.

13. The heating facility as claimed in claim 10, wherein the first inductor and the second inductor are connected individually to the first energising circuit by the first switching means.

14. The heating facility as claimed in claim 10, wherein the second energising circuit is one of connected and not connected to a selected one of the first resonant circuit and the second resonant circuit via a second switching means.

15. The heating facility as claimed in claim 10, further comprising a measuring-and-identification device to measure a characteristic of the first resonant circuit consecutively with the first switching means open and closed and to identify whether the heating element is disposed on only the first inductor, only the second inductor, or both the first inductor and the second inductor.

16. The heating facility as claimed in claim 10, wherein the control unit activates the first switching means at a time when no voltage is present at the circuit for energising the first resonant circuit.

17. A method for induction cooking, comprising:

inducing current to a heating element with a first resonant circuit having at least a first inductor and a second inductor;

energising the first resonant circuit with a first energising circuit;

acting in a first operating mode supplying heat energy to a selected one of the first inductor and the second inductor;

acting in a second operating mode supplying heat energy simultaneously to both the first inductor and the second inductor in a parallel circuit;

inducing current to the heating element with a second resonant circuit having a third inductor;

energising the second resonant circuit with a second energising circuit; and controlling with a control unit the first energising circuit and the second energising circuit such that the first resonant circuit resonates at a same frequency as the second resonant circuit.

18. The method as claimed in claim 17, further comprising:

measuring a characteristic of the first resonant circuit; and identifying whether the heating element is disposed on only the first inductor, only the second inductor, or both the first inductor and the second inductor.

* * * * *